United States Patent Office 3,168,434
Patented Feb. 2, 1965

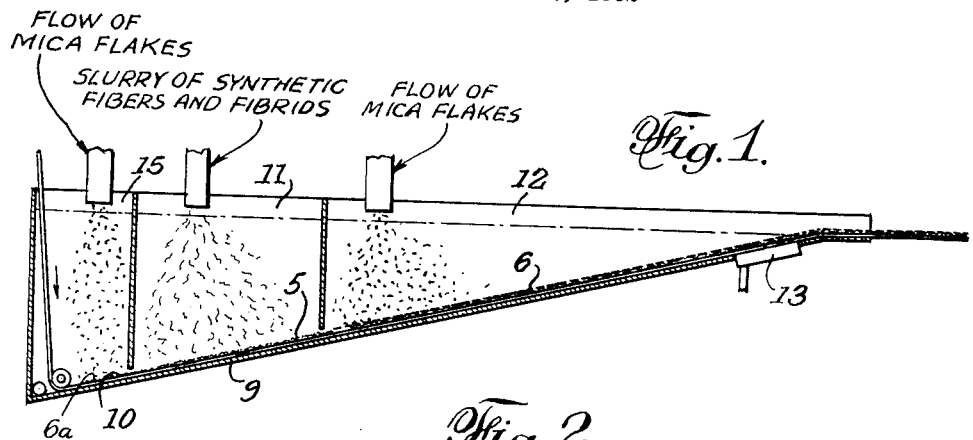
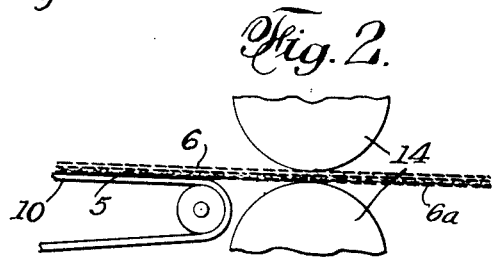
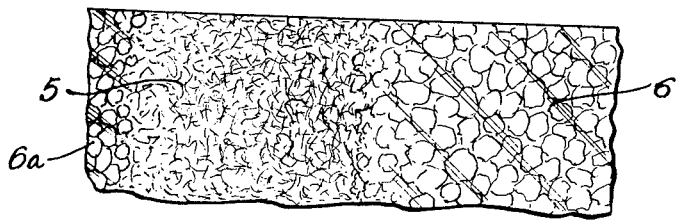
INVENTOR.
MOSES D. HEYMAN
ATTORNEY

3,168,434
PAPER-BACKED MICA
Moses D. Heyman, New Hyde Park, N.Y., assignor, by mesne assignments, to Acim Paper Corporation, New Hyde Park, N.Y., a corporation of New York
Filed Mar. 1, 1962, Ser. No. 176,574
10 Claims. (Cl. 162—124)

This invention relates to a sheet or strip article comprising a layer of mica flakes bonded to a reinforcing backing of paper or cloth formed from fibers, especially synthetic fibers.

Mica flakes, integrated into a sheet without a binder, do not have sufficient tensile or tear strength to be used as a dielectric wrapper. Mica flakes or particles, dehydrated at least partially, and split either by use of chemicals or in a hammer mill, will integrate into a handleable sheet without binder or backing, but need the latter for further support.

The present invention has for an object to provide a natural mica flake sheet or layer, or a layer of synthetic mica, with a backing of synthetic fibers in sheet form and fused to the mica layer—the same hereinafter being called mica paper.

Certain resinous fibers, and also polyester fibers and acrylic fibers, respectively known by their trade names as Nylon, Dacron and Orlon, all products of E. I. du Pont de Nemours & Co., Inc., of Wilmington, Delaware, have been fabricated into sheets or strips that have good tensile and tear strength. Such fibers are fusible by heat up to their respective melting points, but sheets or strips fabricated therefrom lose much of their elasticity and a considerable part of their tensile strength.

Recognizing this fault in a backing sheet of resinous, polyester or acrylic fibers, and yet desirous of utilizing the dielectric properties of such synthetic materials, it is another object of the invention to so modify the composition of such sheet or strip materials as to enable fusion thereof to a layer of mica flakes at a temperature lower than the melting points of the fibers of the respective sheets or strips. Since to melt the fibers of the backing sheet so as to cause them to achieve fusion bonding with a layer of mica flakes would deleteriously affect the elasticity and strength of the backing sheet and the resultant backed mica sheet, the present invention, by lowering the temperature at which bonding of the mica layer and the backing is achieved, retains the initial elasticity and strength of the backing and of the finished sheet. It is the modification of a sheet of fusible paper or cloth made of synthetic fibers having a particular melting point by means of a quantity of synthetic, filmy, fibrous particles which have a lower melting point, and applying bonding heat to such a sheet and a layer of mica flakes in the range between said two melting points, that is the salient feature of this invention. It will be understood that the backed mica sheet may be formed from prefabricated backing and mica sheets, or by means of a method in which the two-layer mica sheet is built up in a continuous manner.

A further object of the invention is to provide a novel and improved method for producing the above-contemplated paper-backed mica sheet.

The foregoing and other objects, features and advantages of the invention will become more clearly evident as the following description of the product and method for producing the same progresses, said description having basis on the accompanying drawing, in which:

FIG. 1 is a semi-diagrammatic sectional view of apparatus for forming the backed mica sheet of the present invention.

FIG. 2 is an enlarged fragmentary view showing a manner of applying heat and pressure to the sheet formed in the apparatus of FIG. 1 to fuse together the components thereof.

FIG. 3 is a face view of the sheet product as the same appears during formation thereof in the apparatus of FIG. 1.

FIG. 4 is a greatly enlarged cross-sectional view of said sheet product.

FIG. 5 is a similar view of a sheet comprising outer mica layers with a fibrous layer therebetween.

As illustrated in FIGS. 3 and 4, the present paper-backed mica sheet comprises a fibrous backing layer 5 and a layer of mica flakes 6, said layers being bonded together in the manner hereinafter described. While FIG. 4 shows but one layer of mica flakes, it will be evident that, regardless how the sheet product may be made otherwise, the same may have a middle fibrous layer and outer mica layers, one on each side of the middle layer. Such a sheet is shown in FIG. 5, the same comprising a middle fibrous layer 5, and outer mica layers 6 and 6a.

The fibers used in the layer 5 may comprise largely polyamide resin fibers made by the polymerization of a hexamethylenediamine salt of adipic acid (Nylon), polyester fibers, made by the condensation of dimethyl terephthalate and ethylene glycol (Dacron), or synthetic fibers of polyacrylonitrile (Orlon), and a lesser amount of fibrids, a synthetic polymeric bonding material. Fibrids are filmy or fibrous particles that are a product of E. I. du Pont de Nemours & Co., Inc., and have the following properties and characteristics. They bond well with synthetic fibers such as Nylon, Dacron and Orlon; have a morphology comparable to that of natural wood pulp; and may be prepared from thermoplastic polymers that are similar in chemical composition to their specific synthetic fibers, such as Nylon, Dacron and Orlon. Such fibrids, whether prepared from the polymers of Nylon, Dacron or Orlon, have the additional property of having a melting point that is lower than the melting point of Dacron fiber which is about 480° F., while that of the fibrid prepared from the polyester polymer of Dacron is about 430° F. at atmospheric pressure. Under pressure, these melting points will lower so that, at about 2000 p.s.i., the Dacron fibers will melt at about 430° F. and the fibrids thereof at about 380° F. At different pressures, these temperatures will vary accordingly, but the temperature differential of the melting points of Dacron, etc., and the fibrids thereof, maintains with but little variation throughout the range between atmosphere and 2000 p.s.i.

By making a slurry of fibers of Nylon, Dacron or Orlon, and fibrids in the proportion of about 25% to 30% fibrids, a fusible paper or cloth formed therefrom by the usual paper-making methods is not only as strong and elastic as a paper of synthetic fibers only, but retains such strength and elasticity when brought to a temperature above the melting point of the fibrids but below that of the synthetic fibers. The resultant fusing of the fibrids, while the synthetic fibers remain unfused, provides a means for effecting a bond between such a paper and a layer or sheet of mica integrated from flakes having nascent or activated surfaces, as disclosed in Patents Nos. 2,405,576 and 2,490,129, or a layer of partly dehydrated mica particles, as previously mentioned. By heating such a fibrous layer 5 while applying pressure varying between 500 to 2000 p.s.i. to said layer 5 and a superimposed mica layer, or by hot-calendering the superimposed sheets, the same are fused together.

FIGS. 4 and 5 show the unfused synthetic fibers 7 and the fused fibrids 8, it appearing that the fusion of the latter causes adherence of the mica layer or layers to the backing sheet, and the unfused synthetic fibers retaining their elasticity and strength and imparting the same to the finished paper-backed sheet product.

It is possible, of course, to make the products of FIGS. 4 and 5 by initially fabricating a fusible sheet of synthetic fibers and fibrids, but it is preferred to produce the same in the following manner.

Preparing a slurry of approximately three parts of a chosen synthetic fiber, as above suggested, and approximately one part fibrids prepared from thermoplastic polymers similar in chemical composition to said fibers, conducting such slurry to a tank 9 having therein a traveling web 10 moving at an upward angle along the tank bottom, and discharging the fibers and fibrids of said slurry into a compartment 11 so that said fibers and fibrids, by flotation, settle downwardly through a level of liquid in said compartment onto said web as the latter moves to form a paper or cloth sheet or layer 5 on said web; providing a flow of liquid-borne mica flakes that have nascent or activated surfaces or partly dehydrated particles, and conducting said flow to and discharging the flakes into a compartment 12 in tank 9 so the same, by flotation, settle downwardly through the liquid in the tank and form a layer of mica flakes 6 on top of the layer 5; applying suction by means of a suction box 13 to the two-layer sheet as the same emerges from the upper end of the tank to retain the layers during such emergence; and finally applying heat and pressure to the two-ply sheet, as suggested in FIG. 2, by passing the same between suitably heated rolls 14 and applying the mentioned pressure at a temperature higher than the melting point of the fibrids 8 to cause the same to fuse together as well as fuse to the layer of flakes, but lower than the melting point of the fibers 7. In this manner the sheet of FIG. 4 is produced.

The sheet shown in FIG. 5 is produced by first discharging a flow of mica flakes or particles into the tank compartment 15 so the same, by flotation, settle downwardly through the liquid in tank 9 and form a layer of mica flakes or particles 6a on the web 10, and then, by successively depositing the layers 5 and 6 and heating and compressing as in FIG. 2, as described above, producing the three-layer sheet product of FIG. 5.

The three-layer sheet, having the fibrous backing confined between layers of mica, will withstand higher temperatures and make a better dielectric material, due to greater resistance to deterioration of said backing when protected on both sides by mica.

The thicknesses of the layers 5 and 6 and/or 6a may be proportioned as desired.

Subsequent impregnation with insulating varnishes or resins may be applied, or the sheet used in its form when leaving the fusing rolls, as desired.

Inasmuch as the above-described sheet and method may be varied without departing from the spirit and scope of the invention, I desire to reserve to myself such variations thereof that may fall within the scope of the appended claims.

I claim:

1. A reinforced mica sheet comprising a fusible ply of synthetic fibers chosen from among resin, polyester and acrylic fibers, and a quantity of fibrids prepared from the thermoplastic polymers that are similar in chemical composition to the chosen synthetic fibers and having a melting point lower than the melting point of the synthetic fibers, and a ply integrated only from mica flakes having activated surfaces that promote cohesion among the flakes, the mentioned fibrids being in a fused state to bond the synthetic fibers of the fusible ply to the mica ply.

2. A reinforced mica sheet comprising a fusible ply of polyester fibers made by the condensation of dimethyl terephthalate and ethylene of glycol and a quantity of fibrids comprising thermoplastic polyester polymers that have a melting point lower than the melting point of the polyester fibers, and a ply integrated only from mica flakes having activated surfaces that promote cohesion among the flakes, the mentioned fibrids being in a fused state to bond the synthetic fibers of the fusible ply to the mica ply.

3. A reinforced mica sheet according to claim 1 including a second and similar mica ply connected by the fused fibrids to the fusible ply so the latter is sandwiched between the two mica plies.

4. A reinforced mica sheet according to claim 2 including a second and similar mica ply connected by the fused fibrids to the fusible ply so the latter is sandwiched between the two mica plies.

5. A reinforced mica sheet comprising a fusible ply of synthetic fibers chosen from among resin, polyester and acrylic fibers, and a quantity of fibrids prepared from thermoplastic polymers that are similar in chemical composition to the chosen synthetic fibers and having a melting point lower than the melting point of the synthetic fibers, and a ply comprising only partly dehydrated mica particles, the mentioned fibrids being in a fused state to bond the synthetic fibers of the fusible ply to the mica ply.

6. A reinforced mica sheet comprising a fusible ply of polyester fibers made by the condensation of dimethyl terephthalate and ethylene of glycol and a quantity of fibrids comprising thermoplastic polyester polymers that have a melting point lower than the melting point of the polyester fibers, and a ply comprising only dehydrated mica particles, the mentioned fibrids being in a fused state to bond the polyester fibers of the fusible ply to the mica ply.

7. A reinforced mica sheet according to claim 5 including a second and similar mica ply connected by the fused fibrids to the fusible ply so the latter is sandwiched between the two mica plies.

8. A reinforced mica sheet according to claim 6 including a second and similar mica ply connected by the fused fibrids to the fusible ply so the latter is sandwiched between the two mica plies.

9. A two-ply sheet comprising a first ply of mica flakes that have activated coherence-inducing surfaces and which combine to form an integrated mica ply; and a second ply comprising synthetic fibers chosen from among resin, polyester and acrylic fibers, and fibrids among the synthetic fibers and prepared from the thermoplastic polymers that are similar in chemical composition to the chosen synthetic fibers and which are in a fused state, said fibrids bonding the second ply to one face of the first ply.

10. The combination with a two-ply sheet according to claim 9 of a third ply, similar to the second ply, and bonded to the opposite face of the first ply by the fused fibrids in said third ply.

References Cited in the file of this patent

UNITED STATES PATENTS

| 1,477,288 | Shaw | Dec. 11, 1923 |
| 1,754,370 | Raynes | Apr. 15, 1930 |
| 1,784,737 | Lloyd | Dec. 9, 1930 |
| 2,405,576 | Heyman | Aug. 13, 1946 |
| 2,416,143 | Berberich | Feb. 18, 1947 |
| 2,490,129 | Heyman | Dec. 6, 1949 |
| 2,870,819 | Heyman | Jan. 27, 1959 |
| 2,987,101 | Luker | June 6, 1961 |
| 2,993,816 | Blake | July 25, 1961 |
| 2,999,788 | Morgan | Sept. 12, 1961 |
| 3,001,571 | Hatch | Sept. 26, 1961 |
| 3,016,599 | Perry | Jan. 16, 1962 |
| 3,066,065 | Koerner | Nov. 27, 1962 |